(12) United States Patent
Holzer

(10) Patent No.: US 6,558,020 B1
(45) Date of Patent: May 6, 2003

(54) FLAT REFLECTOR LAMP FOR FLUORESCENT TUBES

(76) Inventor: Walter Holzer, Drosteweg 19, D-88709 Meersburg (DE)

( * ) Notice: Subject to any disclaimer, the term of this patent is extended or adjusted under 35 U.S.C. 154(b) by 0 days.

(21) Appl. No.: 09/476,627

(22) Filed: Dec. 31, 1999

(30) Foreign Application Priority Data

Jan. 31, 1999 (DE) .......................................... 199 03 668

(51) Int. Cl.[7] .............................................. F21V 23/02
(52) U.S. Cl. ........................ 362/221; 362/217; 362/301
(58) Field of Search ................................ 362/341, 260, 362/217, 221, 223, 297, 299, 301, 308, 309, 328, 346, 397

(56) References Cited

U.S. PATENT DOCUMENTS

| | | | | |
|---|---|---|---|---|
| 4,393,435 A | * | 7/1983 | Petrina | ........................ 362/377 |
| 4,570,209 A | * | 2/1986 | Wittlin | ........................ 315/183 |
| 4,725,931 A | * | 2/1988 | Bourdon | ...................... 362/151 |
| 5,051,878 A | * | 9/1991 | Nagi | ........................... 362/299 |

* cited by examiner

Primary Examiner—Sandra O'Shea
Assistant Examiner—John Anthony Ward
(74) Attorney, Agent, or Firm—Marshall, Gerstein & Borun

(57) ABSTRACT

A flat reflector lamp for fluorescent bulbs is described. The lamp has a self-supporting reflector with an enclosed hollow portion for mounting an electronic ballast. Electrical sockets on a pair of lamp end plates function as mounts for fluorescent lamps. A circuit board mounted on guide strips within the enclosed hollow portion of the lamp has spring contacts in electrical contact with at least one of the electrical sockets.

7 Claims, 2 Drawing Sheets

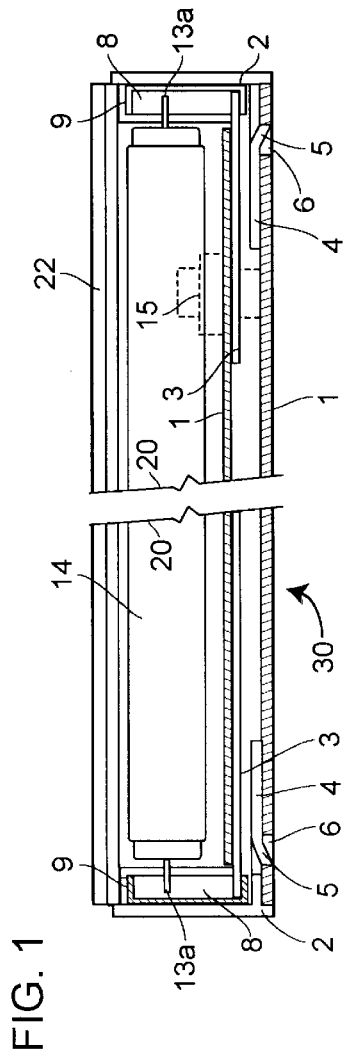
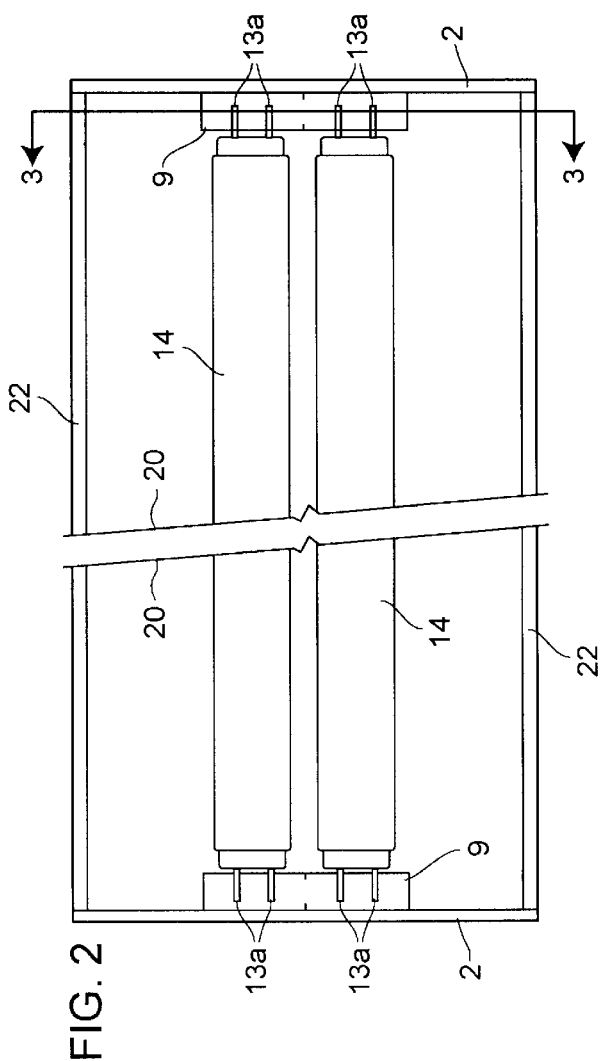
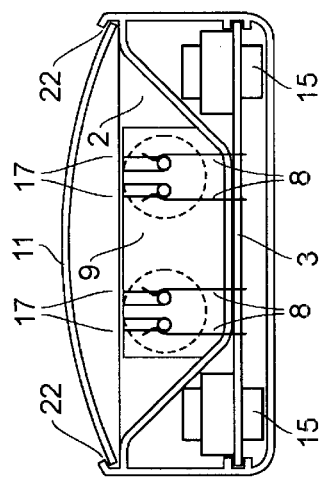
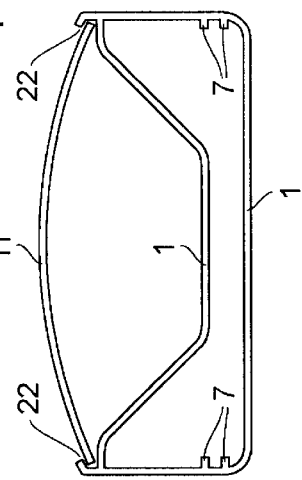
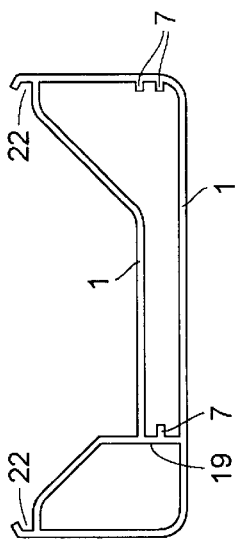

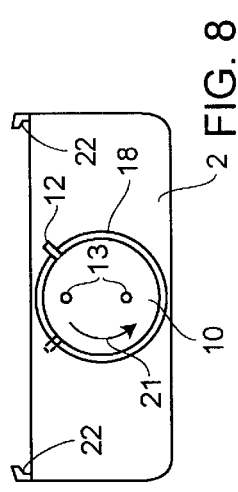
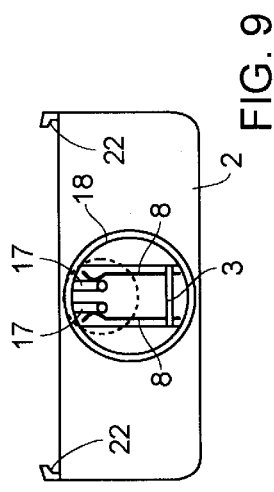
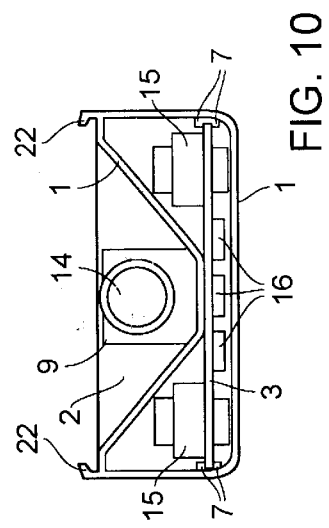
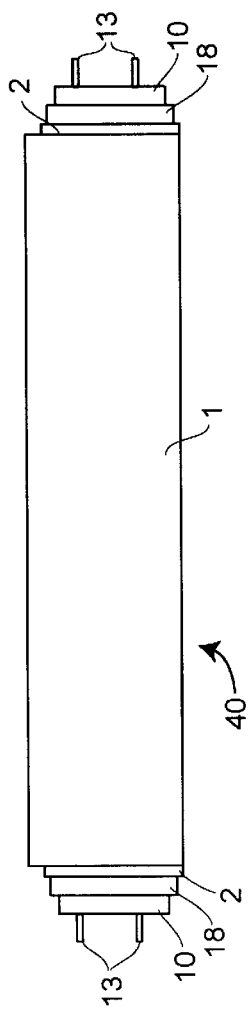
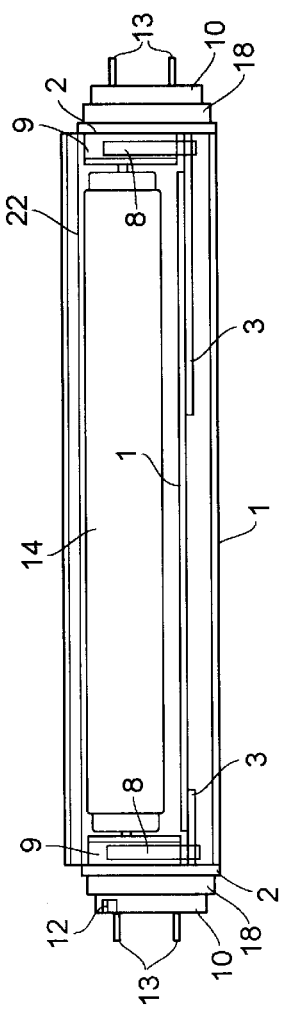
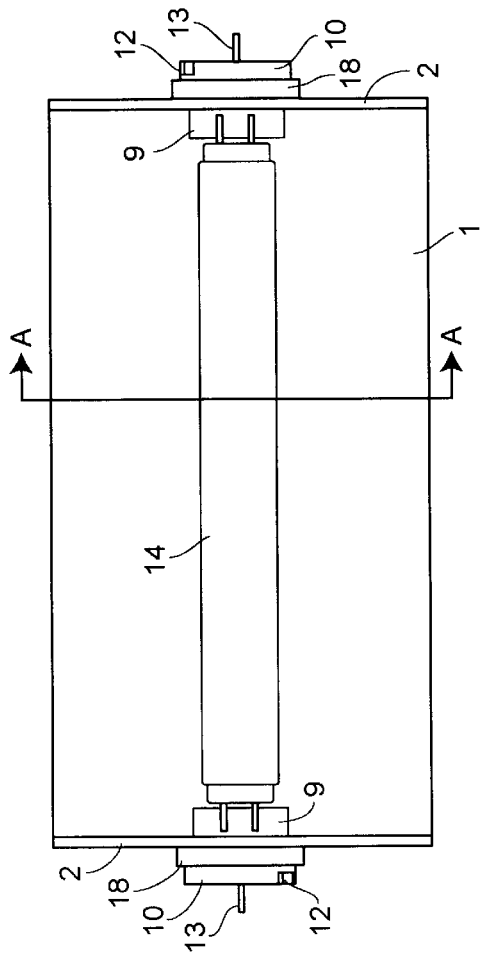

FLAT REFLECTOR LAMP FOR FLUORESCENT TUBES

BACKGROUND OF THE INVENTION

Substantial progress in the development of fluorescent lamps has been achieved in recent years. Reduction of the diameter of the glass tubing used to form the fluorescent lighting element or tube, for example to 16 mm, and the use of new fluorescent materials has made it possible to increase light output substantially. When compared with previous fluorescent tubes with 40 or 27 mm diameter, these new, reduced-diameter tubes exhibit an increase in light output of up to 50%, as much as 104 lumens per watt has been mentioned in the trade literature.

Light quality could also be significantly improved not only by employing new fluorescent material mixtures, but also by using higher frequencies for the current passing through the fluorescent tubes, thus avoiding the stroboscope effect resulting from the use of low frequency "mains" power.

However, high-performance fluorescent lamps require an electronic ballast and cannot be used as replacements without difficulty in conventional fluorescent lighting assemblies which use an inductive ballast.

As a consequence, hundreds of millions of existing fluorescent lighting assemblies are obsolete and require an urgent remedy. The desire for replacement is universal, but the high cost connected with disassembly of old lamps and installation of new ones are a disincentive.

SUMMARY OF THE INVENTION

The task of the invention is to provide cost-effective fluorescent lighting assemblies that are geared both in dimensions and design toward the present demands. Because cost is a factor, the apparatus of the present invention uses a minimal amount of components, packaged in a rational manner to ensure rapid and simple installation. A preferred embodiment of the present invention configures a portion of the lamp assembly as a semilamp, enabling the retrofitting of existing lamp assemblies that do not operate electonically.

This task is solved by a new reflector lamp element in which the reflector element is designed as a self-supporting, extruded or drawn hollow section, which is at least partially closed on the ends by two plates, each end plate provided with at least one socket for mounting and delivering power to a fluorescent bulb, and in which the electronic components of the ballast are situated within the hollow section. In instances where more light is required, the end plates can be fitted with additional sockets in order to mount multiple fluorescent tubes within the lighting assembly.

This type of arrangement permits not only an extremely flat design, but also a stable and protected accommodation of the sensitive electronic compounds. Assembly of the end plates with a hollow section is facilitated by guide surfaces that extend into the hollow section, in which the guide surfaces snap into corresponding recesses of the hollow section with at least partially elastic snaps.

The extruded hollow sections can also be equipped with guide strips to secure a circuit board to the electronic ballast, at minimal additional cost. The arrangement of spring contacts on the circuit board that lead directly to the sockets of the fluorescent lamps is possible and is a feature of a preferred embodiment.

A particularly advantageous variant of the reflector lamp assembly according to the invention consists of designing it as a semilamp, which means configuring it so that it is provided on both end surfaces with pin bases and is insertable into an existing lamp apparatus that is still not operated electronically in order to retrofit it to advantageous, energy-saving high-frequency operation.

It is further recommended in order to facilitate insertion of such a semilamp into existing lamps that the pin bases arranged on the end surfaces be mounted to rotate by about 90°. This expedient avoids the otherwise cumbersome insertion into the sockets by pivoting the entire semilamp. In a preferred embodiment of the present invention, only the rotatable pin base need be rotated.

BRIEF DESCRIPTION OF THE DRAWINGS

FIGS. 1 to 4a show a reflector lamp assembly in accordance with the present invention, said assembly adapted to hold two fluorescent tubes.

FIG. 1 is a longitudinal section and FIG. 3 a cross section of this double lamp assembly.

FIG. 2 is a frontal view of the double lamp assembly.

FIGS. 4 and 4a are cross sections through the extruded section.

FIGS. 5 to 10 show a semilamp assembly comprising a reflector element, a single fluorescent tube or bulb, and a pair of electrical contacts on each end of the reflector element.

FIG. 5 is a side view of this semilamp assembly.

FIG. 6 is a longitudinal section through the apparatus of FIG. 5.

FIG. 7 a frontal view of this semilamp assembly.

FIG. 8 is a view of the end plate and

FIG. 9 is a view of the end plate with the rotatable base removed.

FIG. 10 is a cross section of the semilamp.

DETAILED DESCRIPTION OF PREFERRED EMBODIMENTS

The subsequent detailed description of lamp assemblies according to the invention is based on drawings of preferred embodiments for better understanding of the invention, but in no way is to be interpreted as restrictive, since the design details can easily be adapted to corresponding desires.

The designations employed in the examples of the base/socket system G5 and G13 correspond to the worldwide standardized systems, but also are not to be interpreted as restrictive. However, these are the most widespread systems. The base/socket system G5 is proposed in particular for the new high-performance fluorescent lamps with 16 mm diameter. The description refers to this system for this reason. The invention can naturally also be used for any other base/socket system, even a future one.

The same reference numbers are used in all depictions for the same parts.

The double line depicted in FIGS. 1 to 4 shows particularly clearly the enormous simplification of a lamp element (30) with a reflector configured as a hollow section (1), which simultaneously serves to accommodate the electronic ballast and is equipped only on the ends with two end plates (2) that support sockets (9). Sockets (9) are adapted to hold and supply power to a fluorescent lighting tube (14) by means of a pair of conventional tube pins (13a) on each end of tube (14).

Lamp element (30) consists merely of two essential parts, namely the extruded hollow section (1) and two identical end plates (2) that can be mounted on both ends. Lamp element (30) includes the circuit board (3) with eight identical elastic spring contacts (8), which are soldered directly into the circuit board (3) and naturally the actual electronic components of the ballast. The remainder are small parts, for example, for connection of line voltage, which can be selected from an enormous variety of standardized finished parts.

The hollow section (1) is shown in FIG. 4 which additionally shows the possibility of providing a transparent cover (11) insertable in grooves (22), which is not closed on the ends for reasons of ventilation.

FIG. 4a shows a variant for a situation in which only a narrow circuit board (3) is provided and an additional stiffening of the hollow section (1) is desired with intermediate wall (19). This type of reinforcement is advised in an extruded plastic section, since the wall thicknesses can be reduced on this account in order to save material. The same naturally also applies to a drawn section of aluminum or other material.

FIG. 1 also shows the simple installation, for example, with spring snaps (5) on the guide surfaces (4) of end plates (2). The end plates (2) are simply pushed into the hollow section (1) until the spring snaps (5) snap into the recesses (6) in the hollow section (1). The spring contacts (8) previously soldered onto circuit board (3) are pushed into the downward open sockets (9) and the circuit board (3) then threaded into the guide strip (7) and installation of the electronics is thus completed. Since connection to line voltage in many cases, for example in the US, occurs by loose wires that are directly soldered to the circuit board (3), a special depiction of the connection terminals is dispensed with. An enormous number of standard plug connections or terminals that are applied to the circuit board (3) are available for selection.

The depicted example of a double lamp starts from the newest high-performance fluorescent lamps T5 with only 16 mm diameter. This type of lamp would have a design height of only 30 mm at a width of only 90 mm, a level of miniaturization that is advantageous from both a technical sense and a business sense because of the lower material and installation costs. Because of their high light density, a reflector is of special importance for the new T5 lamp, an open arrangement is advised against. FIG. 2 shows a reflector surface with a width about three times that of the combined diameters of fluorescent lamps (14).

Ordinary lamps with inductive ballast cannot be equipped with the new high perfromance fluorescent lamps. The T5 lamps require an electronic ballast and have a G5 pin base with a different pin spacing.

Since the design length is only a question of length of hollow section (1), cut lines (20) are drawn in FIGS. 1 and 2 to emphasize this.

FIG. 3 shows in a scale section how even somewhat clumsy electronic components, like transformers (15) or equivalently designed inductive chokes can be accommodated in hollow section (1) beneath the reflector. A possibility thus far unutilized is a compact design in a hollow section.

Another variant of the idea of the invention is the semilamp assembly (40) depicted in FIGS. 5 to 10 with a fluorescent lamp (14). Semilamp assembly (40) is suitable for converting existing lamp apparatus that is still equipped with obsolete, inductive ballast, to significantly better electronic lamps.

The pin bases (10) arranged on end plates (2) of assembly (40) serve for this purpose. Pin bases (10) have a pair of lamp element pins (13) which correspond to the standardized G13 base/socket system, so that they can be inserted in practically any of the presently available lamps. The depicted example assumes that one also intends to utilize the enormous advantages of the new T5 fluorescent tubes and the depictions are shown accordingly. Thus, pin bases (10) have an inwardly-facing socket (9) adapted to mate with the pins (13) of T5 lighting tube (14). All subsequent descriptions naturally also apply to a semilamp with two fluorescent lamps (14) according to FIGS. 1 to 4 and vice-versa.

Semilamps for retrofitting of obsolete lamps are already being offered, but not in the compact design with a hollow section (1). A peculiarity of the semilamp according to the invention consists of the fact that the pin base (10) is mounted to rotate by an angle of about 90° in a sleeve (18). The semilamp can therefore be inserted into existing sockets (9) without complicated contortions and the semilamps locked into the sockets of the existing lamps by rotating the pin base (10).

FIG. 5 shows a side view of a semilamp with hollow section (1) for which all the aforementioned details, like incorporation of circuit board (3), guide surfaces (4), spring snaps (5), etc. apply without restriction. The arrangement of pin base (10), which is mounted to rotate in sleeve (18), is different.

FIG. 8 shows a view of the end plate before insertion into an existing lamp. Element (30) has a pair of lamp element pins (13) which are oriented in the direction of insertion into the lamp assembly and lock the semilamp in the lamp being retrofitted by rotation of pin base (10) in the direction of arrow (21). Rotation of pin base (10) is facilitated, for example, by a protruding handle (12) which arrives in the position shown with the dashed line after rotation.

FIG. 9 shows a special design configuration of end plates (2) in order to be able to produce them with simple dies. In this case the sockets (9) are designed open from the side of the rotatable pin base (10) so that the connection wires from the electronics to pins (13) required as feed lines can also be led out. Since this opening is covered after insertion of the rotatable pin base (10) by it, no additional cover is required to protect the voltage-conducting spring contacts (8).

The rotatable pin base (10) is expediently equipped with stops to limit the rotational movement and with snap connections in known fashion.

FIG. 10 is section A—A through the semilamp and shows that even with limited width, sufficient space is available for the electronic components. SMD component (16) finds sufficient space beneath circuit board (3) so that the dimensions of the circuit board (3) can be kept small.

To summarize, it can be stated that a lamp design according to the invention in a protective and stable hollow section offers enormous advantages. The number of parts in such a lamp is reduced to a minimum. The material and work expense offered not only cost advantages, but also mean a significant unburdening of the environment by lower energy consumption.

A comparison with previous methods of equipping lamps with separate ballasts, installing them and equipping them with terminals and connection lines in complicated housings is scarcely possible and redundant. The cost-effective, new configuration of a compact lamp according to the invention is appropriate for promoting the use of energy-saving lamps and opening up new spheres of interest.

What is claimed is:

1. A reflector lamp element for fluorescent lamps, comprising:

a self-supporting reflector having an entirely enclosed hollow section;

guide strips within said hollow section for mounting at least one circuit board;

a circuit board mounted on said guide strips, said circuit board having an electrical spring contact on the surface thereof;

a pair of end plates connected to the reflector, on opposite sides thereof, wherein each of the end plates includes an electrical socket for mounting a fluorescent lamp, and at least one of said sockets is adapted to electrically contact said circuit board spring contact; and an electronic ballast mounted within the hollow section of the reflector.

2. The reflector lamp element of claim 1, wherein each end plate further includes a guide surface that extends into the hollow section.

3. The reflector lamp element of claim 1, wherein each end plate further includes an elastic snap that snaps into the hollow section.

4. The reflector lamp element of claim 1, wherein said circuit board is operatively connected to said electronic ballast which is mounted in the hollow section.

5. The reflector lamp element of claim 1, wherein the reflector lamp element is a semi-lamp.

6. The reflector lamp element of claim 5, wherein at least one pin base is disposed on the outside of each end plate.

7. The reflector lamp element of claim 6, wherein at least one of the pin bases disposed on the outside of each end plate is rotatable by an angle of about 90°.

* * * * *